W. A. WOOLSEY.
HORSESHOE CALK.
APPLICATION FILED APR. 15, 1914.
1,148,207.
Patented July 27, 1915.
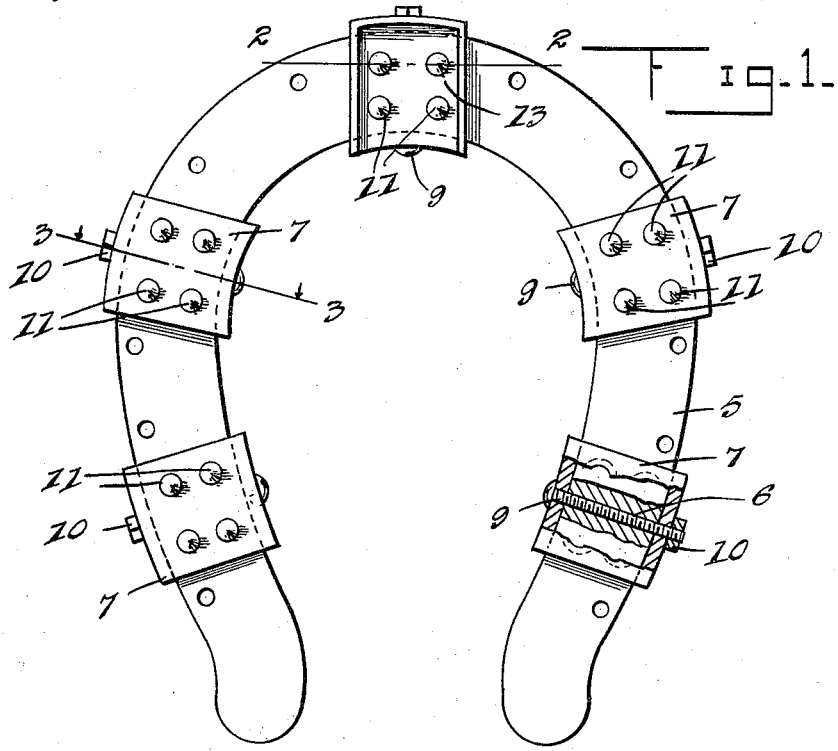
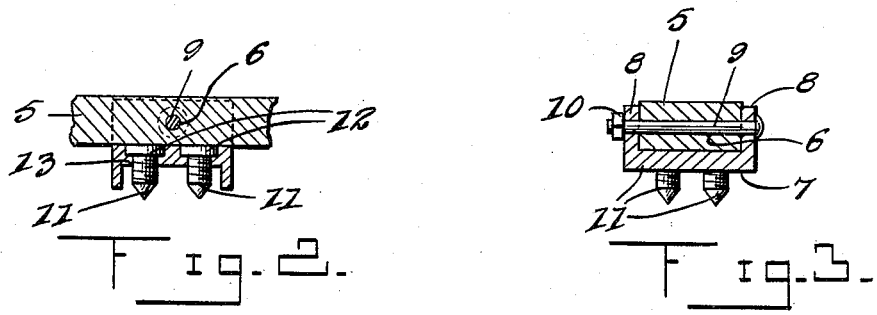
Witnesses
C. A. Bealle.
Chas. P. Seebold.
Inventor
W. A. Woolsey.
By
Attorney
COLUMBIA PLANOGRAPH CO., WASHINGTON, D. C.

UNITED STATES PATENT OFFICE.

WILLIAM A. WOOLSEY, OF BROOKLYN, NEW YORK.

HORSESHOE-CALK.

1,148,207.  Specification of Letters Patent.  Patented July 27, 1915.

Application filed April 15, 1914. Serial No. 832,022.

*To all whom it may concern:*

Be it known that I, WILLIAM A. WOOLSEY, a citizen of the United States, residing at Brooklyn, in the county of Kings and State of New York, have invented certain new and useful Improvements in Horseshoe-Calks, of which the following is a specification.

This invention relates to horseshoes and more particularly to a quick detachable calk therefor.

The invention has for its object to provide a horseshoe calk of improved and simplified construction embodying essentially a U-shaped clip, means for securing the clip in position upon a horseshoe and a plurality of calks removably and interchangeably secured in the web portion of the clip.

With these and other objects in view, the invention consists in the novel construction, arrangement and formation of parts as will be hereinafter specifically described, claimed and illustrated in the accompanying drawings, in which, Figure 1 represents a bottom plan view, partly broken away, of a horseshoe constructed in accordance with my invention, Fig. 2 represents a transverse sectional view on the line 2—2 of Fig. 1, and Fig. 3 represents a transverse sectional view on the line 3—3 of Fig. 1.

Referring to the drawing in detail, wherein similar reference numerals designate corresponding parts throughout the several views, the numeral 5 indicates a horseshoe of any preferred shape and construction having a plurality of transverse openings 6 formed through the side and toe portions thereof. U-shaped clips 7 having apertures through the parallel portions 8 thereof are adapted to be engaged over the sides of the shoe 5 in the position shown in Fig. 3. Securing bolts 9 are positioned through the parallel portions 8 and the openings 6 of the shoe and are provided with suitable nuts 10 for locking the bolt against removal. The web portion of each clip 7 is formed with a plurality of openings preferably threaded through which the threaded shanks 11 of the calks are positioned. One end of each calk carries a head 12 countersunk in the web portion of the clip 7 and engaged against the bottom face of the shoe 5, and the opposite ends thereof are preferably pointed. A front clip 13 is provided on its side and front edges with depending flanges of slightly less length than the length of the exposed portions of the calks 11.

In use, the horseshoe 5 may be used with or without the calk securing clips, and may be quickly and conveniently attached by slipping the clips 7 over the sides of the shoe and registering the openings in the parallel portions thereof with the openings in said shoe, subsequently securing the bolts 9 through said openings. When the calks are damaged or worn to such an extent as to require new ones, they may be quickly removed by turning the heads 12 thereof which are preferably formed with suitable slots to receive a screw driver or similar tool.

What I claim is:—

1. A device of the character described comprising a U-shaped clip, said clip having downwardly extending flanges formed on the under surface thereof and provided with a plurality of openings, threaded calks removably secured in said openings, and means for securing said clip to a horseshoe.

2. A device of the character described, comprising a U-shaped clip, the legs of said U-shaped clip provided with bolt receiving apertures, the web portion of said clip having downwardly extending flanges formed thereon, said flanges formed on the under surface and outer edges of said web portion, said web provided with a plurality of calk receiving openings, calks removably secured in said openings and means carried by said clip for securing said U-shaped member to a horseshoe.

In testimony whereof I affix my signature in presence of two witnesses.

WILLIAM A. WOOLSEY.

Witnesses:
AGNES M. JENKINS,
MARY WILKINSON.

Copies of this patent may be obtained for five cents each, by addressing the "Commissioner of Patents, Washington, D. C."